3,475,369
COLLOIDALLY DISPERSIBLE α-OLEFIN COPOLYMERS
Harry W. Blunt, Claymont, Del., assignor to Hercules Incorporated, Wilmington, Del., a corporation of Delaware
No Drawing. Filed Aug. 25, 1967, Ser. No. 663,209
Int. Cl. C08f 15/04, 47/20
U.S. Cl. 260—33.6    9 Claims

ABSTRACT OF THE DISCLOSURE

Crystalline copolymers of α-olefins in the form of particles 0.02 to 0.5 micron in size, with the majority in the range 0.1 to 0.4 micron are described. Such copolymers are characterized as having a crystallinity less than 90% of that of a homopolymer prepared from the monomer present in major proportion and as being colloidally dispersible. Applications for these particles illustrating their ease of handling are also described.

---

This invention relates to certain solid, colloidally dispersible α-olefin copolymers, to colloidal dispersions of such copolymers and to certain uses thereof.

The crystallizable olefin polymers and copolymers employed in industry at the present time are prepared and marked in the form of particles principally of 30 microns minimum size up to about 500 microns. For many applications it would be desirable to have particles much smaller than this. For example, in applications, involving the formation of films from high molecular weight polymers, it has not been possible to prepare extremely thin films using the standard melt and solution extrusion techniques due to the high viscosity of such polymers and copolymers, which limits the ability of the polymer to flow or to be spread into thin films. Thin films can also be prepared by applying a layer of the solid polymer and the solvent and fusing the same. The lower limit of thickness of such films, however, is limited by the size of the polymer particles, film thickness being greater than the thickness of the average size particle. Furthermore, due to the high viscosity of the polymer and resultant resistance to flow, such films are not uniform in thickness nor are they coherent. In other applications, where it is desirable to incorporate the polymer into another material, it is extremely difficult to effect a uniform distribution of the polymer throughout the second material, due to the relatively large particle size of the presently available materials.

Accordingly, the art has been actively searching for ways of preparing olefin polymers and copolymers in the form of extremely small particles on the order of 1 micron and less in the maximum dimension. In the past, it has been attempted to prepare such small particles by dissolving the polymer in an active solvent at an elevated temperature, emulsifying the solution, and stripping off the solvent. Another method which has been proposed is to swell the polymer in a diluent, adding the swollen polymer to a dispersing medium and comminuting the same under high shear. Ball milling and other forms of mechanical grinding have also been utilized. However, the product resulting from any of these prior art techniques is always in the form of particles, the bulk of which has a maximum dimension of at least 5 microns with essentially no particles of less than 1 micron.

To date, a product has not been prepared in which substantially all of the particles are less than 1 micron in their maximum dimension. Accordingly, objections such as those described above, resulting from large particle size, are applicable in large degree to all the products known to the prior art.

Now, in accordance with this invention, crystallizable copolymers of α-olefins have been discovered which are in the form of extremely finely divided particles and which can readily be dispersed in liquid media. The unique combination of properties exhibited by these copolymers has not been found in prior art copolymers. Briefly stated, the invention includes within its scope a copolymer of a first olefin selected from the class consisting of ethylene, butene-1, 3-methyl-butene-1, 3-methyl-pentene-1, 4-methyl-pentene-1 and styrene, and about 2 to 25 mole percent of a second α-olefin having 2 to 20 carbon atoms, including inter alia, ethylene, propylene, butene-1, pentene-1, 3-methyl-butene-1, hexene-1, 4-methyl-pentene-1, heptene-1, octene-1, decene-1, dodecene-1, tetradecene-1, hexadecene-1, octadecene-1, eicosene-1, styrene, and alkyl- and halo-styrenes such as p-chlorostyrene, p-methylstyrene, said copolymer being characterized by:

(1) having an average primary particle size within the range 0.02 to 0.5 micron with at least 75% of said particles being in the range 0.1 to 0.4 micron, said primary particles existing as discrete particles and reversible clusters of said discrete particles and essentially free of irreversible clusters having a particle size greater than 5 microns,
(2) being more than 50% crystallizable,
(3) exhibiting a crystallinity less than 90% of the crystallinity of a homopolymer of the monomer present in the major proportion, and
(4) being colloidally dispersible in a liquid, non-solvent diluent to form a stable dispersion free of irreversible clusters of the primary particles larger than about 5 microns.

The significant feature of the instant invention is that, for the first time, α-olefin copolymers are provided in which substantially all of the primary particles are less than 1 micron in their largest dimension. The term "primary particles" refers to discrete polymer particles which are in a state of subdivision beyond which no further subdivision can be effected by mechanical means. The prior art has not known α-olefin copolymers which were substantially all in the form of particles of this size or of the extremely narrow range of size distribution. Nor has the prior art known an olefin copolymer which is so readily dispersed in liquid media.

The terms "crystalline" or "crystallinity" and "crystallizable" which will be used in this specification have different meanings and should not be confused. A crystallizable polymer or copolymer is one which is capable, due to its steric configuration, of forming into a crystal lattice under the proper conditions. By this is meant that when the polymer is dissolved by heating in an appropriate diluent, such as decahydronaphthalene, it will crystallize from the solution on cooling and can be separated by filtration or centrifugation. Most olefin polymers prepared under low temperature, low pressure conditions contain a major portion of this crystallizable material and a minor portion of totally amorphous material which is unable to crystallize. The crystallizable portion of the copolymer is theoretically capable of crystallizing to a 100% crystalline state, although it actually never reaches that point due to a number of factors, primarily steric factors. Each polymer or copolymer has a maximum degree of crystallinity which it can actually reach. All of the factors which affect the crystallinity level of a specific polymer or copolymer have not been explained, although it is known that, inter alia, stereoregularity and ratio of monomers, appear to have an effect. Since crystallinity and heat of fusion are related phenomena, crystallinity will be referred to in terms of heat of fusion, hereafter, since the latter is more conveniently determined. References to crystallinity can be read as references to heat of fusion. It is found that the copolymers according to this invention should have a crystallinity no more than about 90% of that inherently present in a homopolymer of the principal monomer. Higher crystallinities appear to result in nonreproducibility of the required small particle size. The lower limit of crystallinity is that at which the copolymer begins to exhibit excessive solubility in the diluent.

The ready dispersibility of the particles of the instant invention is believed to be related to their extremely small particle size. As will be recognized, the small size particles are substantially all within the colloidal size range. Such small particles exhibit a relatively high degree of "Brownian" movement essential to maintenance of a true colloidal solution or suspension. Since substantially all of the particles are of submicron size, there are no large particles which tend to settle out of suspension rapidly and carry the smaller particles down with them. Dispersions of these particles are quite stable, capable of standing, with no substantial settling out for long periods. If a small amount of settling does occur, the particles are readily redispersed simply by shaking.

The dispersibility of the copolymer also appears to be related to the crystallinity. The intermediate level of crystallinity of the copolymer leaves a substantial amorphous, i.e., uncrystallized portion in each molecule. This portion is sufficiently similar in chemical characteristics to the hydrocarbon liquid in which polymerization is effected to exhibit an affinity therefor whereby the particle is partially solvated. This affinity is believed to aid in imparting dispersibility to the polyolefin particles. Too much crystallinity appears to hinder dispersibility since the more crystalline material lacks similarity to the polymerization medium. Too little crystallinity, on the other hand, appears to inhibit dispersibility by causing too high a degree of hydrocarbon solubility, which causes the particles to soften sufficiently to agglomerate into particles which are too large to remain suspended. The above explanation is presented as a theory to explain the dispersibility of the particles, but it is, of course, not intended that the invention be tied to any particular theory.

The invention includes all copolymers within the specified range. Such copolymers include, inter alia, those of ethylene and propylene, ethylene—butene-1, ethylene—3-methyl-butene-1, butene-1—ethylene, 3-methyl-butene-1—propylene, butene-1—propylene, ethylene—octene-1, 4-methyl-pentene-1—octene-1, 3-methyl-butene-1—octene-1, ethylene—decene-1, 4-methyl-pentene-1—hexadecene-1, styrene—4-methyl-pentene-1 and 3-methyl-butene-1—styrene.

The copolymers can be either the random (statistical) type wherein the minor olefin is distributed randomly throughout the molecule, or the block type wherein the minor olefin is present only in relatively clearly defined segments within the molecule. Random copolymers are prepared by polymerizing a mixture of monomers substantially continuously throughout the reaction period. The ratio of olefins in the reaction mixture is determined by the desired olefin mole ratio in the finished polymer and by the reactivity ratio of the monomers, since all monomers do not react equally rapidly. The ratios in which various olefin monomers react can readily be determined by the practitioner by simple experimentation. The block type copolymers are prepared by reacting the monomers sequentially. In this case, the addition of the second monomer can be effected either following complete reaction or removal of the first olefin or in the presence of residual amounts of the first monomer.

The concentration and distribution of the minor olefin are important in determining both the crystallinity and crystallizability of the coploymers of this invention. Generally, the block-type copolymers can contain a higher amount of the second olefin and still be crystallizable than can the random type. Thus, the upper limit of the second monomer concentration for a crystallizable block copolymer is about 25 mole percent, whereas that for a random copolymer is about 13 mole percent. The crystalline character of the copolymers is related to the identity of the second olefin, with the shorter olefins in the series being tolerable in greater quantities than the large ones. Thus, it can be seen that the stated limits on second olefin concentration do not apply in every case, but represent ultimate limits, which vary with individual copolymers to maintain the other limiting parameters within their acceptable ranges.

The small particles of copolymer according to this invention exist in the form of discrete primary particles and reversible clusters of these discrete particles which can be up to about 5 microns in size. By reversible cluster is meant a very lightly held group of primary particles which can readily be disintegrated to re-form the primary particles. Disintegration of such particles can be brought about very simply by, e.g., vigorous agitation.

The colloidally dispersible copolymers in accordance with this invention can be prepared by polymerizing a mixture of the desired olefins by a special procedure in the presence of a colloidal dispersion of a trivalent titanium containing catalyst.

It is well known that α-olefins can be polymerized with the aid of catalysts containing organometallic compounds in combination with transition metal compounds. Particularly effective catalysts for this purpose are combinations of alkylaluminum compounds and titanium compounds. When preparing the colloidal dispersions, it is necessary first to prepare a colloidal trivalent titanium catalyst and then use this colloidal trivalent titanium catalyst in combination with an aluminum alkyl compound to polymerize the propylene and obtain the colloidal dispersion. Any titanium trichloride can be used for the preparation of the colloidal catalyst provided that it contains, if any, only a minor amount of the beta form of the titanium trichloride. A particularly active titanium trichloride-containing catalyst is obtained by reducing titanium tetrachloride at low temperature with an aluminum alkyl such as an aluminum sesquichloride and then heat treating the insoluble precipitate so obtained. A colloidal dispersion of the catalyst is then prepared by suspending it in any convenient inert hydrocarbon diluent, as for example, n-heptane, kerosene, etc. To this suspension is then added a dialkylaluminum halide such as diethylaluminum chloride or diisobutylaluminum chloride, in a ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least 6 carbon atoms. Exemplary of the α-olefins that can be used for this purpose are: hexene-1, octene-1, decene-1, undecene-1, dodecene-1, and hexadecene-1. The polymerization of this long chain α-olefin is generally carried out at moderate temperatures, as for example, from about 30° C. to about 70° C. There is obtained by this process a colloidal suspension of the trivalent titanium-containing catalyst. This colloidal suspension can be used at once or stored until desired.

The copolymerization is effected by contacting the desired mixture of monomers with the colloidal titanium trichloride catalyst in the presence of an aluminum alkyl activator. In the case of the highly reactive gaseous monomers such as ethylene and butene-1, the polymerization is best carried out using a suitable inert diluent, e.g., an aliphatic, aromatic, or cycloaliphatic, hydrocarbon as a reaction medium. The catalyst dispersion is added to the reaction vessel containing the diluent and about 5 to 10 millimoles per liter of activator. The olefin gas mixture is then introduced at a rate such that the reaction vessel is slowly pressured to the desired amount and the feed is continued to maintain this pressure until the termination of the polymerization. The polymerization is generally carried out at a temperature within the range from about 10 to 80° C.

When the major monomer is one of the less reactive, liquid olefins such as 3-methyl-butene-1, the monomer itself can serve as the reaction medium and the second olefin can be added thereto either periodically or continuously as required to form the desired type of copolymer.

In either case, the polymerization is generally carried out at a temperature within the range of from about 10° C. to about 80° C. The length of time the polymerization is carried out will be dependent upon the solids content desired or until the viscosity of the reaction mixture becomes too great for easy agitation. The polymerization is stopped by adding a small amount, as for example 2 volume percent, of an alcohol such as n-butanol. The catalyst residues are removed by any of the usual means utilized in the purification of polyolefins, such as, for example, an acid, water or basic wash, treatment with an ion exchange resin or any other convenient means. The unique combination of properties of the α-olefin copolymer particles of this invention permits them to be suspended or dispersed in liquid media to form very stable dispersions. Such dispersions can be prepared conveniently by employing the desired diluent as the medium for the polymerization. However, it is also practical to prepare the polymer in a relatively volatile diluent and then displace that diluent with the one desired for a particular application or in the case where the copolymer is prepared using the major monomer as reaction medium, to displace residual monomer with a more inert diluent for storage or utilization. This diluent transfer is easily effected by adding the new diluent to the suspension and thereafter boiling off the original diluent under conditions whereby the new diluent does not also vaporize. Alternatively, the dispersion can be centrifuged to separate the particles, the original diluent decanted, the new diluent added and the particles redispersed by shaking. This diluent transfer can readily be effected without changing the size of the copolymer particles. It was most unexpected that such an operation could be carried out without agglomeration to large particles taking place, and the dispersion, after diluent transfer, still has the same primary particle size as the original and is still essentially free of irreversible clusters greater than about 5 microns in size.

As already mentioned, this diluent transfer is generally carried out on a dispersion wherein the diluent is a relatively volatile one and preferably it will be one having a boiling range of less than about 100° C., as, for example, heptane, hexane, butane, propane, or even liquid propylene. The new dispersing diluent will then be one that is less volatile than the original one and hence will ordinarily be any higher boiling hydrocarbon, aliphatic or aromatic, or other type of diluent in which material soluble in the original polymerization diluent, e.g., any amorphous copolymer that may be present will also be appreciably soluble.

Another surprising property of the colloidal dispersions is their ability to be dried, i.e., the diluent removed, to leave a substantially solvent-free mass which can be redispersed in a diluent to re-form a colloidal dispersion. The solid, crystallizable copolymer, obtained on drying the colloidal dispersions of this invention, is characterized by the primary particles having retained their colloidal size, i.e., an average particle size of from 0.02 to 0.5 micron. The dried copolymer will be in the form of clusters which are readily redispersed in a liquid, non-solvent diluent to form a stable dispersion of the original primary particles and which dispersion is essentially free of irreversible clusters of particles greater than about 5 microns. Removal of the diluent from the colloidal dispersions can be effected by any of the known methods such as spray-drying, vacuum stripping, drum drying, and the like, the diluent removal being carried out at a temperature below about 100° C., and preferably below about 40° C.

The new solid, solvent-free particulate copolymer of this invention, having an average primary particle size of about 0.02 to about 0.5 micron, can be combined with essentially any desired non-polar liquid diluent and redispersed to the original particle size. In many cases, a simple shaking of the copolymer-liquid mass is effective. It is known to the art to make an olefin polymer or copolymer and to grind the polymer with or without a dispersing medium in order to reduce the size of the polymer particles. However, it is extremely difficult and expensive to achieve a breakdown to even a 10-micron average particle size. Hence, it was most surprising to discover that the colloidal dispersions of this invention could be dried to produce a solid product wherein the colloidal size of the primary particles was retained and that this solid, crystallizable copolymer could be readily redispersed to the particle size that it has before drying.

To redisperse the solid, dispersible copolymer of this invention is a diluent is a comparatively simple in operation; all that is required is a relatively mild mechanical action to "deagglomerate" the particles. In some cases, simply shaking the polymer-liquid mass is sufficient, although stronger means such as a blendor, or a homogenizer can be used. The new dispersible solid copolymer is readily redispersed in any liquid non-polar diluent. Exemplary of such diluents are aliphatic, cycloaliphatic, or aromatic hydrocarbons, or mixtures of the same, such as, e.g., hexane, heptane, octane, decane, cyclohexane, benzene, toluene, xylene, and mixtures of such hydrocarbons such as kerosene, gasoline, or other petroleum fractions, chlorinated aromatic hydrocarbons, and unsaturated hydrocarbons such as, e.g., hexene or styrene. The solid product can be dispersed in any medium, polar or non-polar, although non-polar liquids, and particularly hydrocarbon liquids, are preferred, since no extraneous dispersing aid or surfactant is required. The presence of surfactants is usually desirable in polar media. In preparing dispersions in polar media, it is advantageous initially to disperse the copolymer in a non-polar liquid and then to effect a diluent transfer to the polar liquid in the manner described previously. Polar liquids which can be used include, for example, water, butyl acetate, methyl ethyl ketone, ethylene glycol, the alkyl ethers of ethylene glycol, highly hindered aliphatic ethers such as di-t-butyl ether, and aromatic ethers such as diphenyl ether.

In some cases, it may be desirable to remove the soluble portion of the copolymer. Various methods of removing the soluble fraction can be utilized. For example, the dried copolymer can be extracted with a volatile solvent for the soluble fraction such as pentane, hexane, heptane, etc. Preferably, the soluble material can be extracted before the drying.

The copolymer particles are colloidal in nature, having in their maximum dimension an average particle size of from about 0.02 to about 0.5 micron, and, in addition, the dispersions are substantially free of clusters greater than about 5 microns in size. In addition, these dispersions have a very narrow distribution of the primary particle size, at least 75% of the particles being within the range of 0.1 to 0.3 micron. When examined by light microscopy, the particles are seen mainly as halos, rather than as individually outlined shapes. These particles, or halos, cannot be photographed in liquid suspension because they show great Brownian motion. Therefore, the particle size has been determined by drying-down particles on microscope slides from very dilute suspensions. In addition, the colloidal dispersions of this invention are characterized by their stability, i.e., freedom from settling out to any substantial degree, even on standing for long periods of time. For example, dispersions having total solids content in the range of 10 to 30% may flocculate on standing for a month or more to form a soft, gel-like structure, which will occupy at least 90% of the total volume of the liquid but at most there will be no more than 5 to 10% of a clear, supernatant liquor. There will be no settling to form a fixed cake and the flocculated particles can be immediately redispersed by a simple mild shaking of the container by hand. In contrast to this, dispersions wherein the particle size is greater than 5 microns will separate rapidly to leave a clear supernatant in a few hours.

The crystallizable copolymer in the colloidal dispersions can be of any desired molecular weight and generally will be one having a relative specific viscosity of from about 1 to about 50 or higher. The desired molecular weight will be entirely dependent upon the use to be made of the dispersion. In the same way, the percent solids, i.e., copolymer, in the dispersion can also be varied at will. The dispersions direct from the polymerization process will generally, though not always, be at least 10% copolymer. Obviously, these can be diluted or concentrated. Those made from the dry powder likewise can be made from very dilute up to very high solids content, i.e., 30% or more of copolymer.

The following test procedures are used for determining the physical properties of the colloidal copolymer dispersions of this invention:

SIZE OF PRIMARY PARTICLES AND OF AGGLOMERATES THEREOF

A sample of the dispersion is diluted to approximately 0.001–0.01 g./100 ml. and this diluted dispersion is dried on a microscope slide and the dried material examined by light microscopy and compared with particles whose size is known from electron microscopy.

TOTAL SOLIDS

A weighed portion of the dispersion is dried in a tared dish and the total solids is expressed as grams of total polymer divided by the total weight of the suspension (weight of polymer plus weight of diluent).

STABILITY OF THE DISPERSION

A sample of the dispersion, diluted to 0.1 g./100 ml. in n-heptane, is placed in a calibrated tube and the rate of sedimentation is determined. The copolymer in the dispersions of this invention will remain suspended in n-heptane with very gradual diminution of the suspension concentration over a period of a month or more at room temperature.

PERCENT OF CRYSTALLIZABLE POLYMER

A portion of the dispersion is dried and a weighed portion of the dry polymer (0.5 to 1.5 g.) is heated in 100 ml. of decahydronaphthalene until the polymer is completely dissolved. The solution is then allowed to cool to room temperature, whereupon the crystallizable portion of the polymer separates from the diluent. An aliquot of the clear liquor is dried to determine the amount of polymer that did not crystallize.

REDUCED SPECIFIC VISCOSITY (RSV) OF THE POLYMER

A portion of the dispersion is dried and the Reduced Specific Viscosity is determined on a 0.1% solution of dried copolymer in decahydronaphthalene at 135° C. RSV is defined as the ratio of the specific viscosity to concentration of this 0.1% solution.

HEAT OF FUSION

A speciment of the copolymer is isolated from its diluent and weighed in a tared aluminum pan. The pan and sample are then placed in the sample holder of a Perkin-Elmer DSC–1 differential thermal analysis instrument, and allowed to come to thermal equilibrium at 40° C. The temperature is then increased at a rate of 20° C./minute and a thermogram is recorded showing the endotherm peak at the crystalline melting point of the sample. The area under the endotherm curve is determined and the heat of fusion ($\Delta H_f$) is calculated by the following equation:

$$\Delta H_f = \frac{(\text{Area})\ (\text{Calibration factor, microcalories/sq. in.})}{\text{Weight of sample (milligrams)}}$$

[1] Calibration factor for the particular instrument being employed.

The following examples illustrate the preparation of the crystallizable colloidally dispersible copolymers of this invention and of the colloidal dispersions of the same. All parts and percentages are by weight unless otherwise indicated.

EXAMPLE 1

A nitrogen filled reaction vessel was charged with 1500 millimoles of ethylaluminum sesquichloride as a 25% solution in n-heptane which had been purified by passing over silica gel and sparging with nitrogen gas. With the temperature adjusted to 0° C., 1150 millimoles of titanium tetrachloride were added over about 9 hours and the reactor contents were stirred for 8 hours at 0° C., allowed to warm to room temperature and then heated to 140° C. for 4 hours. After cooling to room temperature, the reaction mixture was washed three times with heptane, stirred for 16 hours with a two-fold molar quantity of a 25% solution of diethylaluminum chloride in n-heptane, and finally the precipitate was washed three more times with n-heptane.

An nitrogen filled reaction vessel was charged with 400 ml. of n-heptane purified by passing over silica gel and sparging with nitrogen gas. To this was added 20 millimoles of diethylaluminum chloride and 10 millimoles of the titanium trichloride catalyst prepared above. The mixture was heated to 55–60° C. and 150 millimoles of octene-1 was added. The mixture was held at about 55 to 60° C. for 20 minutes with occasional shaking. At the end of this time, the catalyst suspension appeared to be a clear red solution due to the cleaving to colloidal size of the titanium trichloride containing crystallites. The suspension was analyzed and found to be about 25 mmolar in titanium.

To another reaction vessel fitted with a stainless steel head, cooling coils and an air driven stirrer were charged 2 liters of n-heptane which had been purified with silica gel and nitrogen. The reactor was evacuated and pressured to 30 p.s.i.g. with a gas mixture containing 92 mole percent ethylene and 8 mole percent propylene at 50° C. Then 20 millimoles of aluminum diethyl chloride was added to the reactor. Addition of the colloidal titanium trichloride catalyst was begun and continued at a rate to maintain constant gas pressure in the reactor head space during the reaction period which was 54 minutes. During this time, 2.87 millimoles of titanium trichloride was consumed. Ethylene and propylene were continuously monitored into the reactor for the entire 54 minutes through rotometers such that the mole ratio of the feed gas remained constant at 92/8 ethylene to propylene ratio.

At the end of 54 minutes, the reaction mass was quenched by adding 20 ml. of n-butanol, then agitated for about 16 hours at 50° C. The mixture was washed with 5% hydrochloric acid and three times with distilled water to remove deactivated catalyst residues. The resultant product was a milky suspension having about 6.3% copolymer which did not settle on standing for several weeks. After several weeks, a small amount of settling had taken place, but the settled material was easily redispersed on shaking by hand.

The average particle size of the copolymer in this dispersion, measured as previously explained, was about 0.4 micron. A specimen of the copolymer was dried of diluent by evaporation and characterized as follows:

Percent crystallizable _____ 83.5
Heat of fusion _____calories/gram__ 30
Propylene content _____mole percent__ 7.3
RSV _____ 24.7

The heat of fusion of an ethylene homopolymer similarly prepared was 38.3 calories per gram.

EXAMPLE 2

The procedure substantially as set worth in Example 1 was repeated using a feed gas of 90/10 ethylene to propylene mole ratio. The reaction was continued at 50° C. for 55 minutes, at which time a milky dispersion containing 6% polymer by weight was recovered. A portion of the polymer was dried and characterized as follows:

| | |
|---|---|
| Average particle size _____ micron__ | 0.4 |
| Propylene content _____ mole percent__ | 9.4 |
| Heat of fusion _____ calories/gram__ | 27.6 |
| RSV _____ | 11.1 |
| Percent crystallizable _____ | 77.7 |

EXAMPLE 3

The procedure substantially as in Example 1 was repeated using a feed gas of 88/12 ethylene to propylene mole ratio. At the reaction temperature, 50° C., the product of this polymerization had the appearance of a suspension of finely divided copolymer, but on cooling to room temperature, the material flocculated into large clusters. When this material was diluted with 20% more heptane and agitated in a Waring Blendor, it formed a suspension having 8.5% solids, which was very similar in appearance to that of Examples 1 and 2, and which remained suspended even at room temperature, with no more flocculation. A portion was recovered and characterized as follows:

| | |
|---|---|
| Average particle size _____ micron__ | 0.4 |
| Propylene content _____ mole percent__ | 12.2 |
| Heat of fusion _____ calories/gram__ | 25.7 |
| RSV _____ | 15.7 |
| Percent crystallizable _____ | 70.4 |

EXAMPLE 4

A feed gas comprising 92 mole percent ethylene and 8 mole percent butene-1 was charged to a reactor containing 2 liters of purified n-heptane and 20 moles of diethylaluminum chloride to pressure the reactor to 10 p.s.i.g. Colloidal titanium trichloride catalyst prepared as in Example 1 was added to initiate polymerization. When polymerization started, catalyst feed and olefin gas feed at 92/8 ethylene to butene-1 ratio were continued at a rate to maintain the initial 10 p.s.i.g. pressure for about 180 minutes, at which time the reaction was quenched and the product recovered as described previously. The resulting dispersion was milky white in appearance and contained 13.1% solid polymer by weight. Infrared analysis indicated that this copolymer contained about 7.2 mole percent of butene-1. Its heat of fusion was 22.7 calories/gram and its RSV was 20.6. The average particle size was 0.4 micron.

EXAMPLE 5

To a reactor containing 20 volumes of heptane was added 30 volumes of 3-methyl-butene-1, 2.6 volumes of a 25% solution of diethylaluminum chloride in heptane and 40 volumes of a 25 millimolar solution of colloidal titanium trichloride catalyst suspension. This mixture was heated to 60° C. and 0.5 volume octene-1 was added. The temperature was maintained at 60° C. for eight hours.

The resulting milky-white dispersion contained about 7.3% solids by weight. The solid, particulate copolymer had an RSV of 1.4 and was all in the form of particles less than about 0.4 micron maximum dimension, with an average of about 0.3 micron. Heat of fusion was about 5.1 calories/gram (compared to about 13.9 for 3-methyl-butene-1 homopolymer) and infrared analysis indicated that the octene-1 content was 2.5 mole percent.

EXAMPLE 6

To a reactor containing 300 volumes of n-heptane was added 80 volumes of a 25 millimolar suspension of colloidal titanium trichloride catalyst in n-heptane, 34.9 volumes of 4-methyl-pentene-1 and 1.3 volumes of a 25% solution of diethylaluminum chloride in heptene. The temperature was adjusted to 10° C., and 2.8 volumes of octene-1 was added and the mass was allowed to react for eight hours at 10° C.

At the end of eight hours, the reaction was quenched and the polymer recovered in the form of a milky dispersion containing about 2.3% solid copolymer. The copolymer had an RSV of 7.1, contained 6.2 mole percent of octene-1, and was in the form of particles less than 1 micron, with an average particle size of 0.4 micron, having a heat of fusion of 8.9 calories/gram. The heat of fusion of a homopolymer of 4-methyl-pentene-1 prepared by a similar procedure was 10 calories/gram.

EXAMPLE 7

An agitated, nitrogen blanketed vessel was charged with 30 parts by volume of 3-methyl-butene-1 which had been passed through a molecular sieve to remove water and other impurities. To this was added 2.9 parts by volume of a 25% solution of diethylaluminum chloride in heptane and 40 parts by volume of a 25 millimolar colloidal titanium trichloride catalyst in heptane. The colloidal titanium trichloride catalyst was prepared by treating a titanium tetrachloride-ethylaluminum sesquichloride reaction product with octene-1 as described in Example 1.

The vessel containing the reaction mixture was heated to 60° C. and held at that temperature for about 8½ hours. Every 30 minutes during this period, 10 parts (vol.) of propylene (S.T.P.) was injected below the surface of the 3-methyl-butenne-1. At the end of the reaction period, the reaction was quenched by adding 10 parts n-butanol, and agitating overnight. The product was then washed with aqueous hydrochloric acid and water until neutral.

A milky white liquid was recovered containing about 6.45% of a copolymer of 3-methyl-butene-1 and propylene, of which about 62% was crystallizable. The copolymer was dried and analyzed as follows:

| | |
|---|---|
| RSV _____ | 2.77 |
| Average particle size _____ micron__ | 0.3 |
| Heat of fusion _____ calorie/gram__ | <1 |
| Propylene content _____ mole percent__ | 16 |

EXAMPLE 8

The procedure substantially as shown in Example 7 was repeated except that butene-1 was used in place of propylene. The resulting dispersion had 7.47% solids. It analyzed as follows:

| | |
|---|---|
| RSV _____ | 3.18 |
| Average particle size _____ micron__ | 0.3 |
| Heat of fusion _____ calorie/gram__ | <1 |
| Butene-1 content _____ mole percent__ | 14.6 |

EXAMPLE 9

A reaction vessel was charged with 60 volumes of styrene at 25° C. To this was added 10 volumes of propylene (S.T.P.), 2.6 volumes of 25% diethylaluminum chloride and 80 volumes of 25 mmolar colloidal titanium trichloride catalyst. The mass was allowed to react at 25° C. for twelve hours, with 10 volumes of propylene added every 30 minutes. At the end of twelve hours, the reaction was quenched with n-butanol, and washed with distilled water. A dispersion containing 4.5% of solid copolymer in liquid styrene was recovered. The copolymer contained 8.3 mole percent propylene and had an RSV of 2.3. Its average particle size was about 0.3 micron, and heat of fusion was 28 calories/gram.

The colloidal dispersions of crystallizable copolymers of this invention have many uses. A particularly important use is in their application as coatings. Because of the extremely fine particle size, freedom from agglomeration, and stability of these colloidal dispersions, it is possible to produce coatings that are less than 1 mil in thickness, if desired, and the coatings have much better gloss than previous coatings, prepared with similar copolymers, since the smaller particles are more readily fused to a smooth surface than are larger ones. In addition, the small particle size permits facile dispersion of pigments in the coatings without sacrificing the gloss of the coating. In fact, it is possible to incorporate in the coating composition an amount of pigment equal to as much as 50% by weight of the total solids of the composition. Pigment dispersions or concentrates can be incorporated in the colloidal dispersions by a simple mixing operation. Pigment dispersants can be used, if desired, as can any other coating additives, stabilizers and antioxidants for the copolymers, and agents for increasing adhesion to the substrate being coated. Such pigmented dispersions have excellent hiding power, flow out, etc., and are advantageous in that the pigment does not settle out.

These coating compositions have a wide variety of applications. They can be used for coating metal, including wire and sheet metal, paper, wood, and other cellulosic materials, fabrics made of natural or synthetic fibers, many plastic materials, glass, and other such materials. Because the copolymer is present as colloidally discrete particles, the coating compositions are of handleable viscosity and not until the coating is fused, by heating to a temperature of from about 100 to 250° C., is a high viscosity developed. Consequently, it is possible to apply, as a coating, much higher molecular weight copolymer than has been possible heretofor.

In coating metals with any olefin polymer or copolymer, it is frequently desirable to apply a primer coating to the metal to increase the adhesion of the polymer to the metal. Of particular value for this purpose is a maleic anhydride—modified amorphous or crystalline polypropylene. A unique property of the colloidal olefin copolymer dispersions of this invention is their ability to be admixed with a dispersion of finely divided maleic anhydride—modified polypropylene to form a self-priming coating composition. The amount of the primer added will generally be within the range of from about 0.1% to about 25%, based on the weight of copolymer in the colloidal dispersion.

The maleic anhydride—modified propylene polymers added to the coating compositions of this invention are solid, resinous polymeric materials containing about 0.05 to about 5%, and preferably about 0.5 to about 4% of chemically combined maleic anhydride by reacting maleic anhydride with any solid propylene polymer, either crystalline or amorphous, containing active centers or sites which are capable of anchoring the maleic anhydride thereon. The preferred propylene polymers from which the maleic anhydride—modified polymers are made are stereoregular polypropylene, amorphous polypropylene and copolymers of propylene and ethylene. These modified polymers desirably have a reduced specific viscosity of about 0.5 to 5, as measured in decahydronaphthalene at 135° C. Active centers at which anchoring will occur can readily be induced on the propylene polymers in known ways, as for example, by subjecting the polymer to the action of high energy ionizing radiation such as gamma rays, X-rays or high speed electrons; by contacting the polymer, either as a solid or a solution in a solvent, with a free radical-producing material such as dibenzoyl peroxide, dilauroyl peroxide, dicumyl peroxide, t-butyl perbenzoate; or by simply milling the polymer in the presence of air. Preferably, the modified propylene polymers are prepared by reacting maleic anhydride with a solution of the desired propylene polymer in an organic solvent containing a free-radical-producing material.

The colloidal dispersions of this invention can also be employed in the preparation of unsupported films from high molecular weight polymer. As has been noted in the case of coatings, trouble is encountered in extruding high molecular weight polymers due to the high viscosity of the polymer both in the melt and in solution. Problems related to this high viscosity can be minimized by using the small particle dispersions of the instant invention in production of film. The dispersion can be formed into the desired shape at a temperature below the solution temperature of the copolymer so that the viscosity of the extrudate is substantially that of the diluent. The temperature can then be raised to the point where dissolution takes place and then the diluent evaporated, leaving a continuous polymer film. Alternatively, the diluent can be removed without dissolving the copolymer and fusion then effected by raising the temperature above the melting point of the copolymer.

Films prepared from the dispersions of this invention can then be subjected to the usual orientation and heat treatment and other operations which are known in the art. They are notable for their improved properties resulting from use of high molecular weight copolymer. Additionally, films prepared in this manner are not subject to die marks or other defects frequently resulting from the extrusion operation.

Colloidal dispersions or powders derived therefrom according to this invention also show utility in slush and powder molding, foam, filler for potting compounds, cosmetics such as face or body powder, cleansing, tooth paste, as adhesives for plywood and paper, as polishing agents, antiblocking film, dusting powder for rubber, as a cover to reduce liquid evaporation, and as a thickener for oils and the like.

In the following examples, several of the utilities of the colloidal particles of this invention are illustrated.

EXAMPLE 10

A dispersion of a copolymer containing 92% ethylene and 8% propylene was prepared as described in Example 1. This copolymer was in the form of particles of average size 0.3 micron.

This dispersion was cast on a glass panel with a 20 mil air knife at room temperature and air dried for two hours also at room temperature. A white, extensible, rubbery film resulted. The unfused film was transferred to a tin plate panel, fused at 200° C. for 90 seconds, then quenched in cold tap water. A clear, smooth, gloosy film resulted which could be stripped from the tin plate without tearing or breaking. This film had a tensile strength of 1200 p.s.i.

EXAMPLE 11

A heptane dispersion (10.9% solids) of a copolymer containing 94.3 mole percent ethylene and 5.7 mole percent propylene was employed in the formation of a pigmented film. To 67 parts of the dispersion was added 1 drop of a surfactant and 4.9 parts of a dispersion prepared by ball milling 900 parts titanium dioxide in 900 parts of a high boiling petroleum fraction (188–265° C.) having dissolved therein 36 parts of a modified amorphous polypropylene containing 0.6% combined maleic anhydride. A portion of the diluent was removed by low pressure stripping. The resultant dispersion had an overall solids content of 17% and the ratio of pigment to polymer was 1 to 3.

This dispersion was cast on a steel panel using a 15 mil air knife, air dried one hour at room temperature, then fused for 12 minutes at 350° C. and quenched in cold tap water. The resulting 1.2 mil film was smooth and white. It had a Knoop Hardness Number (KHN) of 2.5 and 60° gloss value of 64.

The same procedure was also conducted using a dispersion having 20.5 solids and a pigment to polymer ratio of 1:1. Films prepared from this dispersion, 1.2 mil in thickness, had a KHN of 3 and 60° gloss value of 37.

EXAMPLE 12

Specimens of 18-gauge copper wire were thoroughly cleansed by rinsing in trichloroethylene and drying. These specimens were then dipped into a heptane dispersion containing 11.9% of a copolymer of 92 mole percent ethylene and 8 mole percent propylene stabilized with 0.25 weight percent of the reaction product of 1 mole of 4,4'-butylidene - bis(2 - t - butyl - 5 - methylphenol) and 2.5 moles of diphenyl isooctyl phosphite, and 0.125 weight percent distearyl thiodipropionate. The wires were air dried for 2 hours, fused at 200° C. for 3 minutes, and then air cooled. The resulting coating was smooth, had a thickness of about $0.75 \times 10^{-3}$ inches.

The coating exhibited no leakage when tested for continuity using a Triplet model 310 multimeter in a 2% aqueous sodium chloride bath with a stainless steel electrode.

EXAMPLE 13

The previous example was repeated except that the wire was preheated prior to coating by placing it in a 200° C. oven for 5 minutes. Immediately on removal from the oven, it was immersed in the copolymer dispersion, then fused at 200° C. for 4 minutes and air cooled. The coating, $0.65 \times 10^{-3}$ inches in thickness, exhibited no leakage using the continuity test described above.

EXAMPLE 14

A sample of the dispersion used in Example 11 was cast on a ¼ inch maple plywood panel with a 20 mil knife, baked 30 minutes at 50° C. to remove diluent, then fused 20 minutes at 160° C. and air cooled. The resulting film was smooth and continuous, adhering well to the wood. It appeared to be reasonably uniform in thickness although it could not be peeled for measuring.

EXAMPLE 15

A steel panel was cleaned with trichloroethylene, dried and sprayed with a 1% xylene solution of a maleic anhydride modified crystalline polypropylene containing 0.5 weight percent combined maleic anhydride units. The coating was baked for 3 minutes at 200° C.

A heptane dispersion containing 9.6% of a copolymer of 92 mole percent ethylene and 8 mole percent propylene stabilized with 0.25 weight percent of the reaction product of 1 mole of 4,4' - butylidene - bis(2 - t - butyl - 5 - methylphenol) and 2.5 moles of diphenyl octyl phosphite and 0.125 weight percent distearyl thiodipropionate was applied to the panels with a 15 mil air knife. The panels were air dried for 1 hour, baked 7 minutes at 200° C. and then quenched in cold water. Control panels which had not been primed with the modified polypropylene were coated simultaneously.

Adhesion was tested using the standard transparent tape test to pull coating away from a cross hatched area. The coating could be virtually completely stripped from the unprimed panels. Hardly any could be stripped from the primed panels.

EXAMPLE 16

In this example, the titanium dioxide containing composition from Example 11 having 1 to 3 pigment to copolymer ratio was used to coat paper.

A standard offset printing paper was coated using a #20 Mayer rod. A number of specimens were coated and air dried at room temperature for about 5 minutes. These were baked to fuse the coatings under varying conditions, then tested for heat seal strength.

| Sample: | Fusion Temperature, ° C. | Time (minutes) | Heat Seal Temperature,[1] ° C. | Adhesion |
|---|---|---|---|---|
| A | 180 | 3 | 180 | Paper tore. |
| B | 150 | 3 | 150 | Do. |
| C | 135 | 3 | 150 | Do. |
| D | 120 | 3 | 150 | Do. |

[1] 20 lb. pressure for 10 minutes.

The dye penetration of these coated specimens was measured using the Tappi T454–M–60 test dye. The test was conducted by adding 4 drops of the dye to the coated section of paper, allowing to stand for 30 to 120 seconds, wiping off the excess and observing the resultant staining.

| Sample: | Time on Film | Appearance |
|---|---|---|
| A | 30 seconds | No penetration, slight staining. |
|   | 120 seconds | Very slight penetration. |
| B | 30 seconds | No penetration, slight staining. |
|   | 120 seconds | Very slight penetration. |
| C | 30 seconds | No penetration, slight staining. |
|   | 120 seconds | Slight penetration. |
| D | 30 seconds | Slight penetration and staining. |
|   | 120 seconds | Heavy staining and greater penetration. |

A control specimen of the same paper with no coating was tested and heavy staining appeared after only 10 seconds contact between the dye and the paper.

A specimen of Sample A was created then tested for dye resistance along the creased area. The dye resistance appeared as good as that shown above for the uncreased specimen.

EXAMPLE 17

The copolymer of Example 5 was substantially freed of unreacted monomers by centrifuging, decanting the supernatant, washing with hexane and then resuspending the particulate copolymer in hexane to form a 15% solids dispersion. To 60 parts of this dispersion was added 0.5 part of amorphous polypropylene chemically modified by the addition of 0.6% maleic anhydride.

The above dispersion was cast on a stainless steel panel using a 20 mil air knife, air dried one hour at room temperature, then fused for 5 minutes at 375° C. and quenched in cold tap water. The resulting film adhered well to the plate as evidenced by the tape test, had a thickness of 1.3 mils, a KHN of 3 and a 60° gloss of 46.

What I claim and desire to protect by Letters Patent is:

1. A solid, colloidally dispersible copolymer of a first olefin selected from the class consisting of ethylene, butene-1, pentene-1, 3-methyl-butene-1, hexene-1, 4-methylpentene-1, and styrene and about 2 to 25 mole percent of a second olefin having 2 to 20 carbon atoms; the said copolymer being characterized by
    (1) having an average primary particle size within the range 0.02 to 0.5 micron with 75% of said particles being in the range of 0.1 to 0.4 micron, said primary particles existing as discrete particles and reversible clusters of said discrete particles and essentially free of irreversible agglomerates having a particle size greater than 5 microns,
    (2) being more than 50% crystallizable,
    (3) exhibiting a crystallinity equal to less than 90% of the inherent crystallinity of a homopolymer of the monomer present in the major proportion, and
    (4) being colloidally dispersible in a liquid, nonsolvent diluent to form a stable dispersion free of irreversible clusters of the primary particles larger than about 5 microns.

2. The copolymer of claim 1 where the first olefin is ethylene and the second olefin is propylene.

3. The copolymer of claim 1 where the first olefin is ethylene and the second olefin is butene-1.

4. A stable colloidal dispersion comprising the copolymer of claim 1 and a liquid diluent in which the particulate copolymer is insoluble at 20° C.

5. The dispersion of claim 4 where the liquid diluent is a non-polar organic diluent.

6. The dispersion of claim 5 where the copolymer is comprised of ethylene and from about 7 to about 25% propylene and the diluent is an aliphatic hydrocarbon.

7. A coating composition comprising the colloidal dispersion of claim 4 and a pigment.

8. A coating composition comprising the colloidal dispersion of claim 4 and about 0.1 to 25% based on the weight of the copolymer, of a maleic anhydride—modified polypropylene containing about 0.05 to 5% by weight of chemically combined maleic anhydride.

9. A coating composition according to claim 8 which also includes up to about 50% by weight of a pigment.

References Cited

UNITED STATES PATENTS

| | | |
|---|---|---|
| 3,168,506 | 2/1965 | Hoeg et al. _____ 260—93.7 |
| 2,996,459 | 8/1961 | Anderson et al. |
| 3,152,088 | 10/1964 | Sandri et al. |
| 3,210,332 | 10/1965 | Lyons et al. |
| 3,272,788 | 9/1966 | Dietz. |
| 3,282,906 | 11/1966 | Boor, Jr. |
| 3,325,461 | 6/1967 | Boor, Jr. |

FOREIGN PATENTS 979,123    1/1965    Great Britain.

JAMES A. SEIDLECK, Primary Examiner

S. L. FOX, Assistant Examiner

U.S. Cl. X.R.

44—80; 117—132, 161; 156—334; 161—250; 252—59; 260—41, 78.4, 88.2, 878, 897; 424—49, 69, 358